United States Patent [19]

Geissler

[11] Patent Number: 5,560,415
[45] Date of Patent: Oct. 1, 1996

[54] PROTECTIVE PANEL FOR THE WORK AREA OF A MACHINE TOOL

[75] Inventor: Alfred Geissler, Pfronten, Germany

[73] Assignee: Deckel Maho GmbH, Pfronten, Germany

[21] Appl. No.: 390,495

[22] Filed: Feb. 17, 1995

[30] Foreign Application Priority Data

Feb. 18, 1994 [DE] Germany .................... 44 05 247.2

[51] Int. Cl.$^6$ .............................. E06B 9/56; E06B 9/92
[52] U.S. Cl. ................................. 160/220; 160/222
[58] Field of Search .................................. 160/211, 216, 160/220, 202, 222; 408/241 G, 234, 88; 409/134; 74/521

[56] References Cited

U.S. PATENT DOCUMENTS

| | | | |
|---|---|---|---|
| 2,725,578 | 12/1955 | Keller | 74/521 |
| 3,704,959 | 12/1972 | John | 408/241 |
| 4,039,021 | 8/1977 | Moritz | 160/202 |
| 4,950,113 | 8/1990 | Winkler et al. | 409/134 |
| 5,263,800 | 11/1993 | Chen | 409/134 |

FOREIGN PATENT DOCUMENTS

| | | | |
|---|---|---|---|
| 0407599 | 1/1991 | European Pat. Off. | B23Q 11/08 |
| 922630 | 6/1947 | France | B23Q 11/08 |
| 954304 | 6/1956 | Germany | B23Q 11/08 |
| 957709 | 8/1956 | Germany | B23Q 11/08 |
| 3620765 | 12/1987 | Germany | B23Q 11/08 |
| 3713058 | 11/1988 | Germany | B23Q 11/08 |
| 1209854 | 10/1970 | United Kingdom | B23Q 11/08 |

*Primary Examiner*—Blair Johnson
*Assistant Examiner*—Curtis Cohen
*Attorney, Agent, or Firm*—Baker, Maxham, Jester & Meador

[57] ABSTRACT

A protective panel for the work area of a machine tool, consisting of a plurality of segments which are movably interconnected by connection elements. The segments are formed as frames which are nested into each other and shiftable with respect to each other by means of connection elements, the maximum displacement path of the single frame being smaller than the bridge width of the nearest greater size frame.

11 Claims, 3 Drawing Sheets

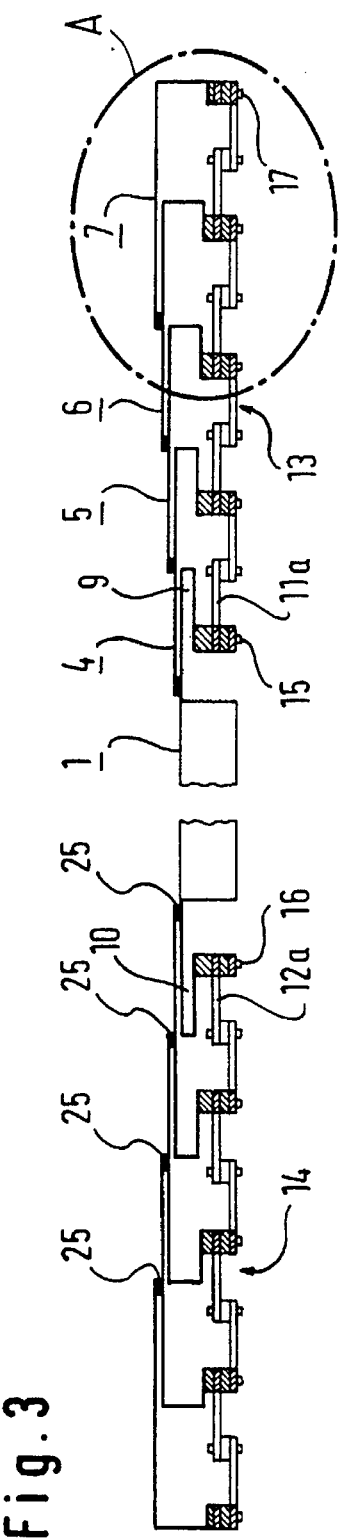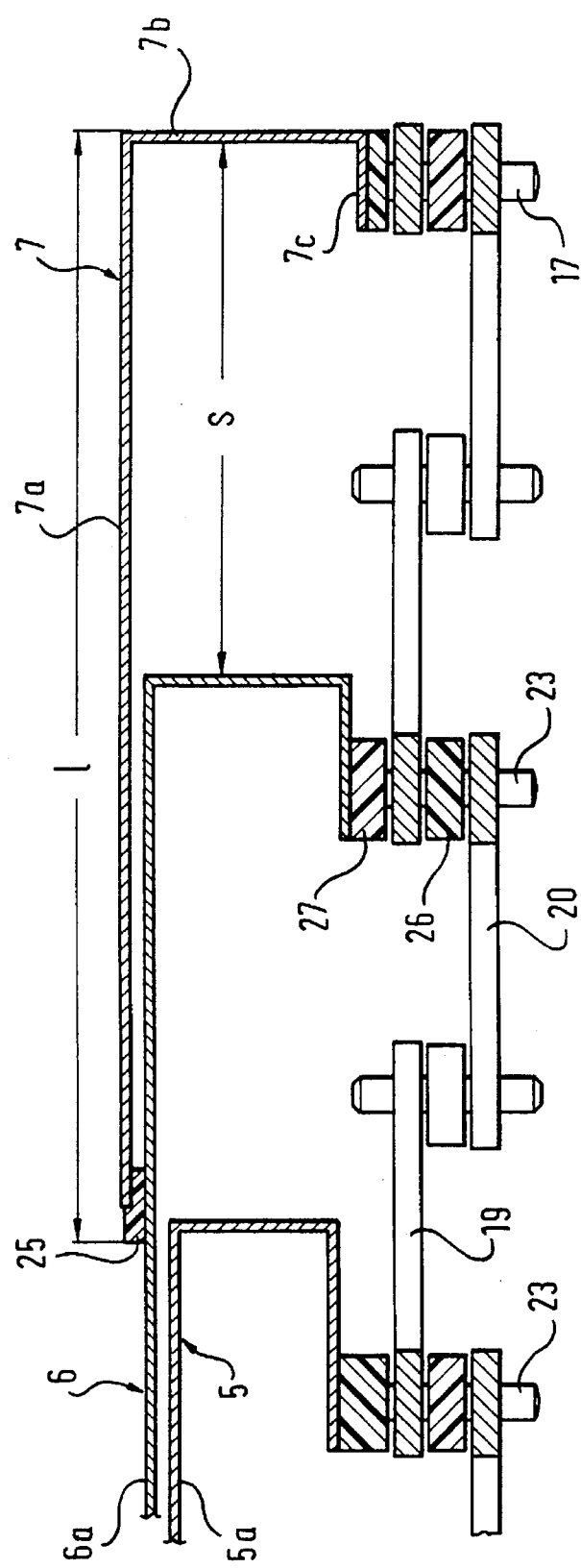
Fig. 3
Fig. 3a

PROTECTIVE PANEL FOR THE WORK AREA OF A MACHINE TOOL

BACKGROUND

1. Field of the Invention

The invention relates to a protective panel for the work area of a machine tool, the panel consisting of a plurality of segments movably interconnected by connection elements.

2. Discussion of the Related Art

In modern machine tools and work centers, particularly for the machining of workpieces, the work space is often separated with respect to the machine parts provided on the rear side by a separation wall to protect the rear parts from contamination by cooling liquid, chips or other materials. The separation walls are generally formed as aprons or shutters to maintain their protective function even with the different relative positions and movements between the workpiece and the work tool. As the shutters used so far have only one degree of freedom, i.e., they can only be contracted and stretched in one axis, a plurality of separate shutter elements aligned at a right angle relative to each other have to be used, respectively, to cover the complete work area of the respective machine tool for all positions of the tool spindle and the work table. This plurality of separate shutter elements increases the construction requirements. Further, there exist sealing problems at the junctions of the single shutter elements to provide effective protection from the work or cooling liquid.

SUMMARY OF THE INVENTION

A purpose of the invention is to provide a protective panel ensuring, by way of a simple construction, a reliable cover of the complete work area in two axes to protect and shield the machine parts on the rear side.

This purpose is accomplished, according to the invention, by a structure where its segments are formed as frames arranged into each other and shiftable against each other by means of connection elements, the maximum displacement path of the single frame being smaller than the bridge width of the nearest larger frame.

The protective panel according to the invention consists of a plurality of frames arranged to partially nest into each other and are shiftable relative to each other. The outermost frame is fixedly connected with a component of the machine tool, for example, the horizontally movable machine stand, and the innermost frame may have a positive connection to the machine slide, for example, the vertically movable spindle housing. The frames can be polygonal or circular or arcuate and are interconnected by special connection elements. The inner frames are movable, respectively, in the outer frames of the same shape and greater dimensions, the inner frame, in a concentric arrangement, respectively protruding to the inside in the direction of the two coordinate axes by approximately half of the bridge width. Two frames are interconnected by at least two connection elements, which allow for limited and coordinated movements of the frames. For rectangular frames, the connection elements are preferably formed as slidable lattice grates to ensure a regular movement of all frames.

Preferably, the innermost frame segment is arranged close to the movable tool spindle and is moved along by the spindle in the vertical plane. The maximum excursion of the innermost frame within the nearest outer frame is obtained, when its outer edge abuts against the outer edge of the outer frame. Due to the coordinated bridge widths of the two frames, a certain overlapping is maintained even in this state, and therefore a cover from the work area is ensured.

Suitably all frames should move as symmetrically as possible, and there should not occur the extreme excursion of every single frame against the nearest one first. This can be obtained by the formation of suitable connection elements.

In the preferred embodiment of the connection elements in the form of slidable lattice grates the braces crossing each other are flexibly connected to the single frames at the cross points, so that an excursion movement of, for example, the innermost frame, is symmetrically transferred to the other-outer-frames by the slidable lattice grate.

Particularly with circular or oval frame shapes other components can also be used as connection elements which interconnect the single frames, so that they are movable in two axes, and ensure a transfer of movement from one frame to the other.

To obtain the greatest possible excursion movements of the single frames and a favourable arrangement of the connection elements on the backside of the frames the frames preferably have a U-shaped cross section, the longest leg of which forms the front side of the frame, and on the shorter leg of which the connection elements are hinged. The length of the center bridge of the U-shaped cross section changes from frame to frame, so that the frames slide into each other with their excursion movements. The longer from side leg is chosen such that even with a maximum excursion of a frame a close covering by the front side leg of the adjacent frame is maintained.

Advantageously, the outermost frame should be reinforced and simultaneously form a support stand for the protection cap of the machine tool, the weight and constructive requirements of which can be considerably decreased in this way.

To ensure an effective sealing against liquids and solid particles between the single frames in all excursion positions, sealing strips formed, for example, of rubber or the like, are suitably provided at the edges of the front side bridge legs.

BRIEF DESCRIPTION OF THE DRAWING

The objects, advantages and features of this invention will be more clearly perceived from the following detailed description, when read in conjunction with the accompanying drawing, in which:

FIG. 3 is a partially broken away side view of the protective panel shown in FIG. 1;

FIG. 3a is an enlarged sectional view of area 3a of the protective panel of FIG. 3;

DETAILED DESCRIPTION OF THE PREFERRED EMBODIMENTS

The protective panel of this invention is designed for a universal drilling and milling machine and its function is to protect the mechanically sensitive rear machine parts, such as the machine stand with the guides, from contamination by chips or work or cooling liquid without affecting the relative movements between the clamped work piece and the work spindle.

Figure 1:
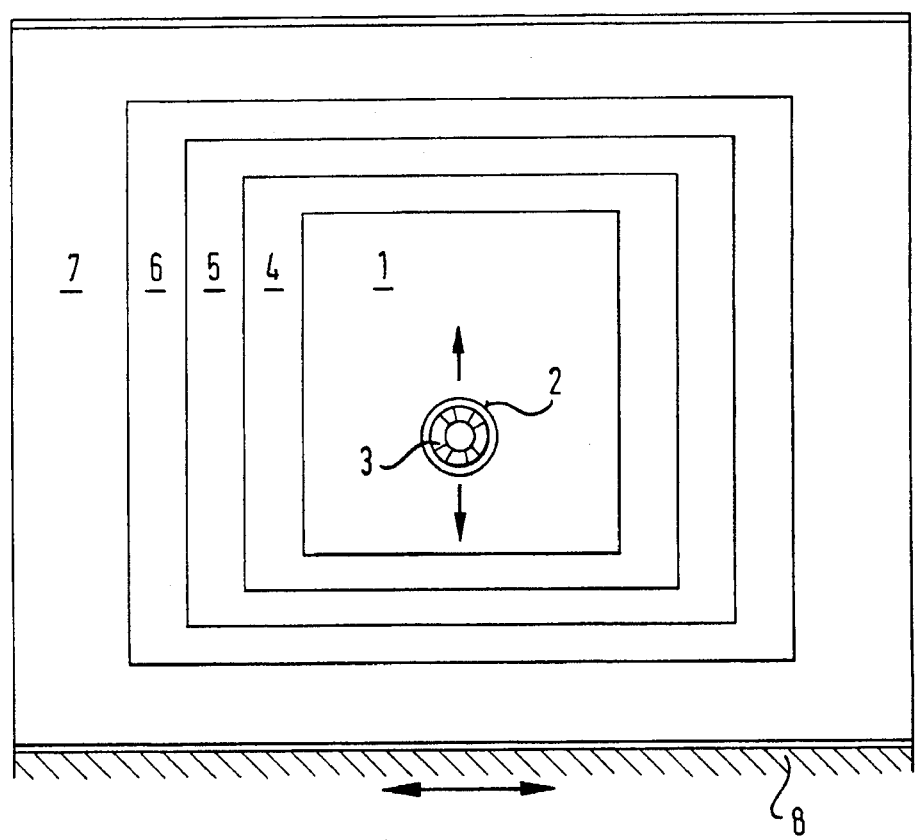
FIG. 1 is a front view of the protective panel of the invention in a neutral position.
Figure 2:
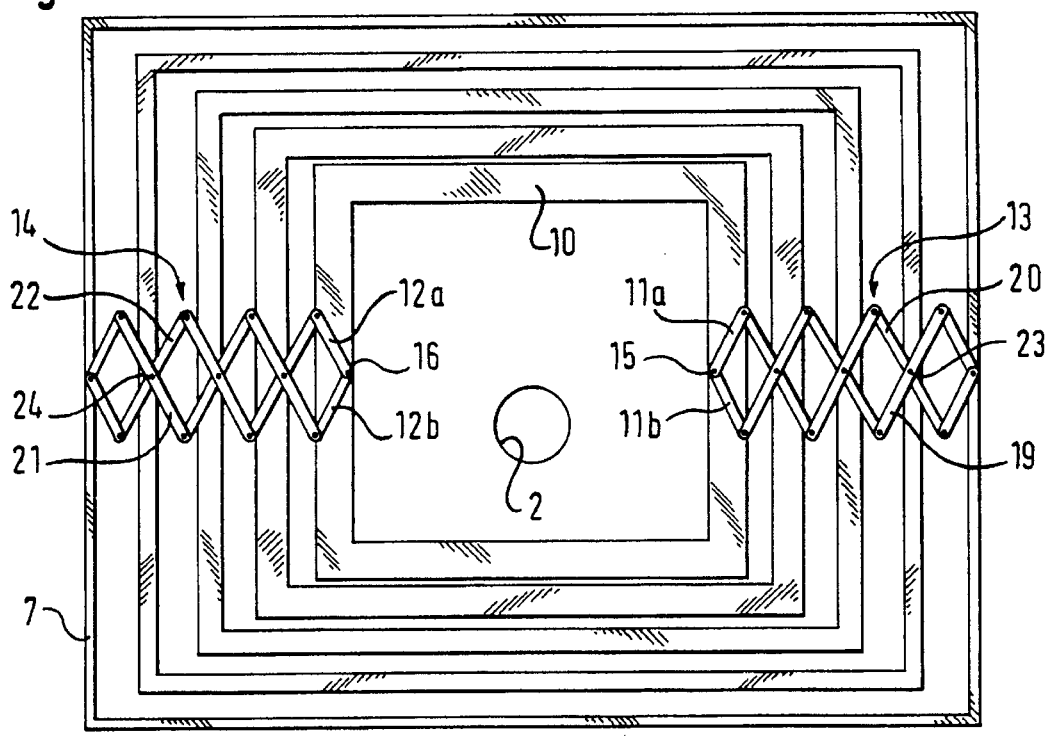
FIG. 2 is a back view of the protective panel shown in FIG. 1, including connection elements.

With reference now to the drawing, and more particularly to FIGS. 1 and 2 thereof, the protective panel includes an inner segment 1, shown rectangular here, having an opening 2, with work spindle 3 protruding through it and being suitably sealed thereto, or being tightly fixed on it or one of its components. Inner segment 1 is surrounded by a plurality of rectangular frames 4 to 7, outer frame 7 being attached to component 8 of the machine tool, for example, a machine stand or a machine bed, frames 4 to 6 being shiftable against each other in the vertical plane.

Figure 6:
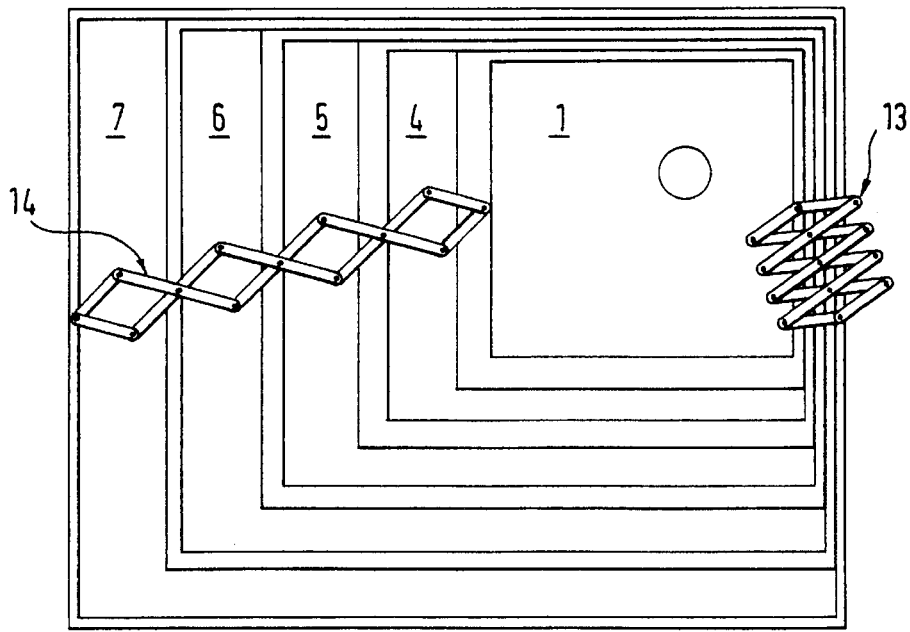
FIG. 6 is a back view of the protective panel of FIG. 4.

As can be seen from FIGS. 2, 3 and 3a, inner segment 1 has U-shaped edge 9, on rear leg 10 of which two end braces 11a, 11b and 12a, 12b of two diametrically opposed slidable lattice grates 13, 14 are pivotably hinged around respective pivots 15 and 16. Inner segment 1 and frames 4 to 7 are interconnected in a relatively shiftable way as shown in FIGS. 2 and 6 by slidable lattice grate 13, 14 acting as connection elements. The two outer end braces of each slidable lattice grate 13, 14 are hinged at rearward leg 7c of outer frame 7, pivotable in an opposite direction around pivot 17, respectively (compare FIGS. 3, 3a). Central frames 4 to 6 are interconnected by equal crossed braces 19 to 22 of the respective slidable lattice grates 13, 14. In each crossing point of braces 19 to 22 there is a pivot 23, 24 seated in the rear leg of frames 4 to 6, respectively, which are U-shaped in cross section. Braces 19 to 22 are interconnected articulately at their ends.

Figure 5:
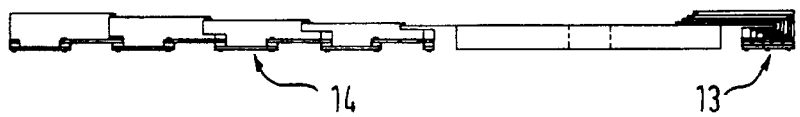
FIG. 5 is a side view of the protective panel of FIG. 4.

As particularly shown in FIGS. 3, 3a, and 5, U-shaped edge 9 and U-shaped frames 4 to 7 have a mouth width increasing from the inside to the outside, that is, an increasing length of the respective center bridge, which is dimensioned such that inner segment 1 and frames 4 to 7 can slide into each other with an excursion movement of work spindle 3 (see FIG. 5). The rear legs of the segment edge and the frames have a length decreasing from the inside to the outside, which ensures a sufficient projection even in a fully pushed-in state, while collisions of the braces and hinges of the slidable lattice grates 13, 14 are avoided.

As shown in the enlarged sectional view of FIG. 3a, outer frame 7 has the shortest rear leg 7c, the longest center bridge 7b and a front bridge 7a, the length of which is larger than the maximum excursion path s of the nearest inner frame 6. In the embodiment shown, the same applies to the front side legs 6a, 5a of the other frames 4, 5, 6. On the end edge of each front side leg 4a–6a a circumferencial sealing strip 25 of a suitable material, with or without sealing lips, is fixed, respectively, which is supported by the front side leg of the nearest inner frame in a sealing sliding contact. According to FIG. 3a, sliding discs and spacers 26, 27, with the thickness increasing to the inside, can be provided on the bearings or joints 15, 16, 23.

The protective panel described above functions as described below.

Figure 4:
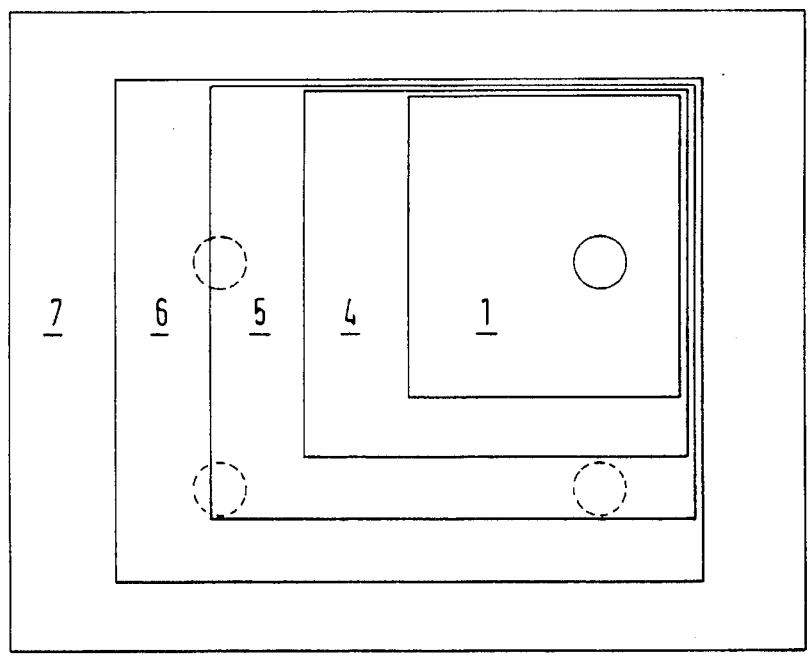
FIG. 4 is a front view of the protective panel of FIG. 1 in an excursion position.

When moving work spindle 3 from the central position shown in FIG. 1 to, for example, the extreme excursion position according to FIG. 4, inner segment 1 is taken along by work spindle 3. At the same time a related excursion movement of inner frames 4 to 6 is effected due to the kinematics given by the slidable lattice grates 13, 14. As the length l of the front side legs of frames 4 to 6 is slightly greater than the maximum displacement path s, a continuous cover of all front side legs is maintained even in the maximum excursion position.

The invention is not limited to the embodiment shown. Other suitable connection elements such as springs or articulated lever systems can be used instead of the slidable lattice grates to transfer the movements of inner segment 1 and/or outer frame 7 to the other components of the protective panel. Further, other forms are possible instead of the U-shaped cross sections of the segment edge and the frames, which ensure a sufficient cover of the front side frame elements in the maximum excursion movement. Finally, the frame elements may as well have a circular or elliptical shape instead of the polygonal form. Even though a simultaneous proportional excursion movement of all frames is preferred, for example, to reduce wear, it may be suitable in special applications to shift the single frames one after the other. Further, the outer frame may be reinforced forming a support stand for the protection cap of the machine tool, whereby the support construction of the protection cap required so far can be abandoned. Furthermore it has turned out suitable not to align the slidable lattice grates 13, 14 horizontally as shown in FIG. 2, but to arrange pivots 15, 16 of the joints in the upper corner portions of each frame 1 to 7, respectively, so that a suspended support of the single frames is achieved, and a greater freedom in the constructive design of the connection elements of the slidable lattice grates can be obtained without the risk of a collision. Besides further arrangements of two or more slidable lattice grates are also possible.

In view of the above description, it is likely that further modifications and improvements will occur to those skilled in this technical field which are within the scope of the appended claims.

What is claimed is:

1. A protective panel for the work area of a machine tool, said protective panel comprising:

a plurality of panel segments; and connection elements connected to said panel segments to permit relative movement of said panel segments with respect to each other:

said panel segments being formed as frames having a front bridge, a rear leg, and a center bridge connecting the front bridge and rear leg that define a frame inside, the frames being nested into each other and shiftable with respect to each other along two axes through said connection elements, the maximum displacement path of each said frame being smaller than the front bridge width of the next outer nested said frame.

2. The protective panel according to claim 1, wherein said frames have a U-shaped cross section with a mouth opening toward the frame inside, the front bridge of which overlap and at the rear legs of which said connection elements are arranged, the mouth width of said U-shaped cross sections of the inner nested said frame being smaller than that of the outer nested said frames.

3. The protective panel according to claim 1, wherein at least some of said frames have sealing strips at their edges.

4. The protective panel according to claim 2, wherein at least some of said frames have sealing strips at their edges.

5. The protective panel according to claim 1, wherein said frames are polygonal.

6. The protective panel according to claim 2, wherein said frames are polygonal.

7. The protective panel according to claim 3, wherein said frames are polygonal.

8. The protective panel according to claim 1, wherein the innermost nested of said frames is a substantially continuous plate having an opening configured to receive a work spindle of the machine tool, and having a U-shaped edge.

9. The protective panel according to claim 1, wherein said connection elements are formed as slidable lattice grates.

10. The protective panel according to claim 9, wherein each nested frame is attached to the slidable lattice grates.

11. The protective panel according to claim 10, wherein attachment of the nested frames occurs at frame leg midpoints.

* * * * *